(12) United States Patent
Eloy et al.

(10) Patent No.: US 12,066,307 B2
(45) Date of Patent: Aug. 20, 2024

(54) DETERMINING THE ANGULAR POSITION BY MEANS OF AN X+1-TOOTH CAMSHAFT SENSOR

(71) Applicant: VITESCO TECHNOLOGIES GMBH, Regensburg (DE)

(72) Inventors: Stéphane Eloy, Toulouse (FR); Fabien Joseph, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/012,155

(22) PCT Filed: Aug. 20, 2021

(86) PCT No.: PCT/EP2021/073111
§ 371 (c)(1),
(2) Date: Dec. 21, 2022

(87) PCT Pub. No.: WO2022/063496
PCT Pub. Date: Mar. 31, 2022

(65) Prior Publication Data
US 2023/0258478 A1    Aug. 17, 2023

(30) Foreign Application Priority Data

Sep. 24, 2020 (FR) .................. 2009686

(51) Int. Cl.
*F02D 13/02* (2006.01)
*F02D 41/00* (2006.01)
(Continued)

(52) U.S. Cl.
CPC ......... *G01D 5/2457* (2013.01); *F02D 41/009* (2013.01)

(58) Field of Classification Search
CPC ...... F02D 41/009; F02D 41/062; F02D 41/22; F02D 41/222; F02D 41/226; F02D 41/24;
(Continued)

(56) References Cited

U.S. PATENT DOCUMENTS 4,553,426 A * 11/1985 Capurka ............ G01D 5/2457
                                                       73/114.26
7,310,574 B2 * 12/2007 Di Cola .............. F02D 41/222
                                                       701/115
(Continued)

FOREIGN PATENT DOCUMENTS

| EP | 0 506 399 | 9/1992 |
|---|---|---|
| WO | 2019/020903 | 1/2019 |
| WO | 2020/016342 | 1/2020 |

OTHER PUBLICATIONS

International Search Report for PCT/EP2021/073111 dated Nov. 26, 2021, 4 pages.
(Continued)

*Primary Examiner* — John Kwon
*Assistant Examiner* — Johnny H Hoang
(74) *Attorney, Agent, or Firm* — NIXON & VANDERHYE

(57) ABSTRACT

Disclosed is a method for determining the angular position of a shaft by a sensor including a toothed wheel including p teeth distributed at equal angles and an additional tooth and a sensitive element that is able to detect a tooth, including the following steps: receiving a tooth signal and the date thereof; shifting the preceding time intervals: Tn−3←Tn−2, Tn−2←Tn−1, Tn−1←Tn; determining the current time interval according to the formula Tn=tn−tn−1; calculating a ratio according to the formula Rn=(Tn*Tn−3)/(Tn−1*Tn−2); and comparing the ratio with a threshold, if the ratio is greater than the threshold, the current tooth signal corre-
(Continued)

sponds to the second tooth immediately following the first tooth, itself immediately following the additional tooth.

9 Claims, 2 Drawing Sheets

(51) Int. Cl.
*G01D 5/24* (2006.01)
*G01D 5/245* (2006.01)

(58) Field of Classification Search
CPC .... F02D 41/263; F02D 41/3005; F02D 13/02; F02D 13/0215; F02D 2041/001; F02D 2041/0092; F02D 2400/08; G01D 5/24; G01D 5/2457
USPC ............... 701/103, 115; 123/339.1–339.29; 73/114.45
See application file for complete search history.

(56) References Cited

U.S. PATENT DOCUMENTS

| 10,533,509 | B2* | 1/2020 | Zouboff | F02D 41/26 |
| 2013/0151194 | A1 | 6/2013 | Hawken et al. | |
| 2013/0218426 | A1* | 8/2013 | Li | G01L 3/101 |
| | | | | 701/51 |
| 2013/0291672 | A1* | 11/2013 | Hess | G01D 5/245 |
| | | | | 74/412 R |
| 2015/0377654 | A1* | 12/2015 | Agrawal | G01D 5/2455 |
| | | | | 702/150 |
| 2019/0360410 | A1* | 11/2019 | Jones | G01D 5/2492 |
| 2020/0209306 | A1 | 7/2020 | Eloy et al. | |
| 2021/0222637 | A1 | 7/2021 | Ibanez et al. | |

OTHER PUBLICATIONS

Written Opinion of the ISA for PCT/EP2021/073111 dated Nov. 26, 2021, 6 pages.

* cited by examiner

DETERMINING THE ANGULAR POSITION BY MEANS OF AN X+1-TOOTH CAMSHAFT SENSOR

CROSS-REFERENCE TO RELATED APPLICATION(S)

This application is the U.S. national phase of International Application No. PCT/EP2021/073111 filed Aug. 20, 2021 which designated the U.S. and claims priority to FR 2009686 filed Sep. 24, 2020, the entire contents of each of which are hereby incorporated by reference.

BACKGROUND OF THE INVENTION

Field of the Invention

The invention relates to the field of measuring the angular position of a rotating shaft, such as a camshaft, for an internal combustion engine.

Description of the Related Art

It is known, in order to determine the angular position of a rotary shaft, such as a camshaft, to use a sensor comprising a toothed wheel, secured to the shaft, comprising teeth and a sensitive element that is disposed fixedly facing the toothed wheel and is able to detect a tooth. This sensor is able to provide a signal for each tooth detected.

According to the prior art, a toothed wheel of a camshaft sensor comprises a small number of teeth, generally between 3 and 16. These teeth are irregular both in terms of their respective positions and their respective angular extents. In order to determine the angular position of the toothed wheel and therefore of the associated shaft, various methods exist which, for the most part, take advantage of this irregularity.

However, camshaft sensors have recently been developed, the toothed wheel of which is referred to as an X+1 differential toothed wheel, in that it comprises X+1 teeth, with a usually small angular extent that is usually equal from one tooth to another, these X teeth being angularly equidistant, or all disposed at 360°/X, and an additional tooth (hence the name X+1 teeth), disposed between two of these X teeth, preferably half-way between these two teeth. This new toothed wheel profile makes the methods designed for the old toothed wheels obsolete, mainly on account of the lower irregularity and asymmetry of the teeth.

SUMMARY OF THE INVENTION

Thus, the invention proposes a new paradigm for determining the angular position of an X+1 toothed wheel.

To this end, a subject of the invention is a method for determining the angular position of a shaft by means of a sensor comprising a toothed wheel, secured to the shaft, comprising p teeth distributed at equal angles and an additional tooth disposed between the last tooth and the first tooth, preferably half-way in between, and a sensitive element that is disposed fixedly facing the toothed wheel and is able to detect a tooth, comprising the following steps:
receiving a tooth signal and the date thereof,
shifting the preceding time intervals: $T_{n-3} \leftarrow T_{n-2}$, $T_{n-2} \leftarrow T_{n-1}$, $T_{n-1} \leftarrow T_n$,
determining a current time interval separating the current tooth signal from the preceding tooth signal, via the difference in dates, according to the formula $T_n = t_n - t_{n-1}$, where $T_n$ is the current time interval, $t_n$ is the date of the current tooth signal and $t_{n-1}$ is the date of the preceding tooth signal,
calculating a ratio according to the formula $R_n = (T_n T_{n-3})/(T_{n-1} * T_{n-2})$, where $R_n$ is the ratio for the current tooth signal, $T_n$ is the current time interval for the current tooth signal, $T_{n-1}$ is the time interval for the preceding first order tooth signal, $T_{n-2}$ is the time interval for the preceding second order tooth signal and $T_{n-3}$ is the time interval for the preceding third order tooth signal,
comparing the ratio with a threshold, if the ratio is greater than the threshold, the current tooth signal corresponds to the second tooth immediately following the first tooth, itself immediately following the additional tooth.

Particular features or embodiments, which are usable on their own or in combination, are:
the threshold is determined according to the formula:

$$G = k \cdot \max_{i=1 \ldots p+1}[((Ang_i - Ang_{i-1})*(Ang_{i-4} - Ang_{i-3}))/((Ang_{i-2} - Ang_{i-1})*(Ang_{i-3} - Ang_{i-2}))], \text{ where:}$$

G is the threshold,
max is the maximum function,
k is an acyclism factor,
$Ang_i$ is the angular position of the i-th tooth, with i passing through all of the p+1 teeth, including the additional tooth,
the acyclism factor k is equal to 0.53,
the method is applied to a camshaft.

A second aspect of the invention relates to an engine control comprising a processing unit provided with means for implementing such a method.

A third aspect of the invention relates to a motor vehicle comprising such an engine control.

BRIEF DESCRIPTION OF THE DRAWINGS

The invention will be understood better from reading the following description, given solely by way of example, with reference to the appended figures, in which.

DESCRIPTION OF THE EMBODIMENTS

Figure 1:
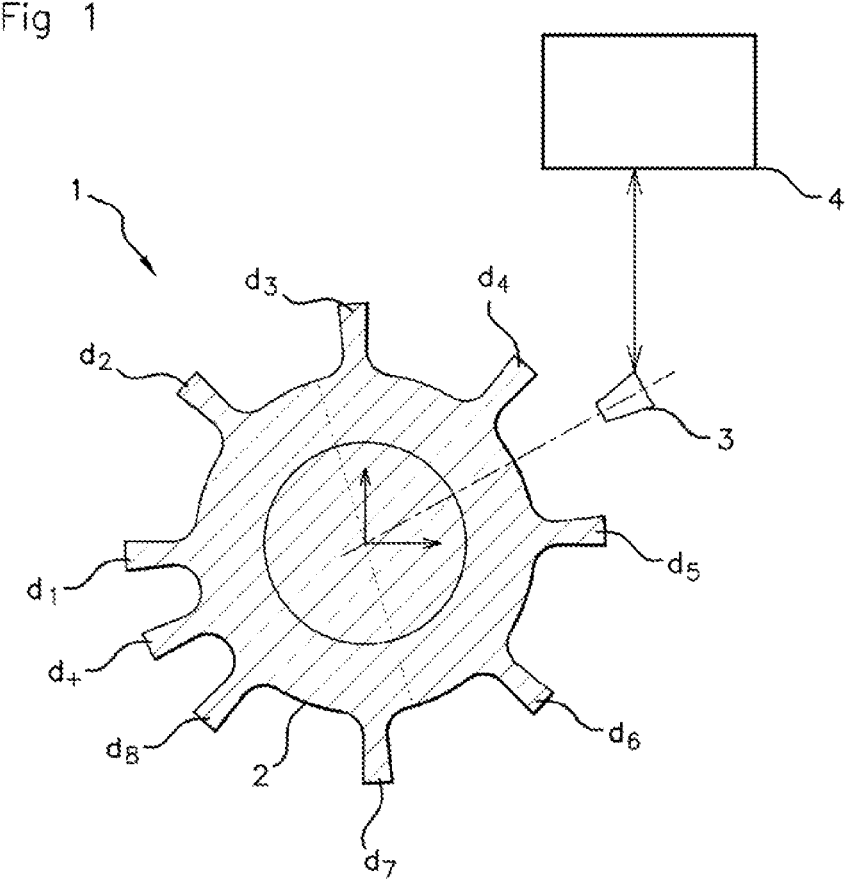
FIG. 1 shows an angular position sensor.

FIG. 1 illustrates a sensor 1 that is able to determine an angular position of a rotary shaft.

This sensor 1 comprises a toothed wheel 2 of differential type that rotates as one with the shaft of which the angular position is intended to be measured. This toothed wheel 2 is of the X+1 type. It comprises X+1 teeth, with X teeth d1–dp, where p=X, which are distributed at equal angles around the periphery of the toothed wheel 2, and an additional tooth d+. X may be any number.

The toothed wheel 2 illustrated comprises 8+1 teeth. These teeth d1-d8 are at spacings of 360°/8=45°, and the additional tooth d+ is disposed at 22.5° from each of its two neighbors.

The additional tooth $d_+$ is disposed between two of the X teeth $d_1$-$d_p$, preferably half-way in between. In the following text, it is presumed, by convention, that the additional tooth $d_+$ is disposed between the last tooth $d_p$ and the first tooth $d_1$.

The sensor 1 also comprises a sensitive element 3 disposed fixedly facing the toothed wheel 2. This sensitive element 3 is able to detect a tooth $d_1$-$d_p$, $d_+$. In a known way, via the sensitive element 3, the sensor 1 produces an all-or-nothing measurement, having a high or, respectively, low state when it detects material, i.e. when the sensitive element 3 is facing a tooth $d_1$-$d_p$, $d_+$, and an opposite, i.e. low or, respectively, high, state when it does not detect material, i.e. when the sensitive element 3 is facing a void between two teeth.

Thus, the sensitive element 3, for each mechanical tooth that passes it, will produce two edges: a first edge at the start of the tooth and a second edge at the end of the tooth, on the opposite side from the first edge. The first edge is for example a rising edge, while the second edge is a falling edge, or vice versa. As shown above, the teeth are identical and the information on the tooth length, or temporal/angular duration between the two edges, is scarcely relevant. Moreover, only one of the two edges is retained, and is referred to as the active edge or tooth signal $S_n$.

Figure 2:
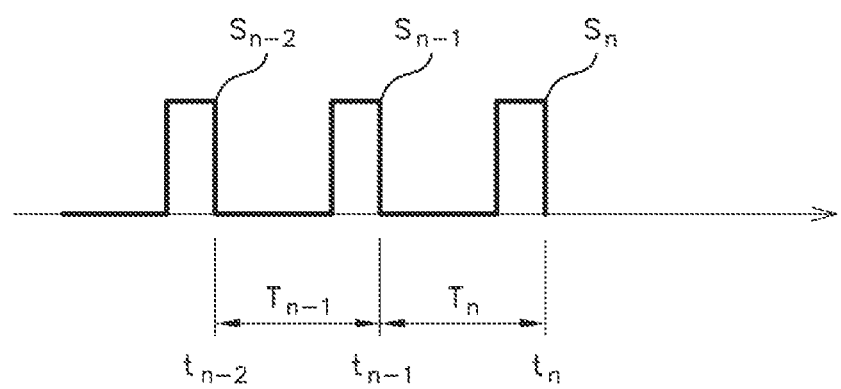
FIG. 2 shows a measurement output by such a sensor.

Thus, the measurement output by the sensor 1, shown in FIG. 2, is indicative of the presence of a tooth $d_1$-$d_p$, $d_+$, and comprises a tooth signal $S_n$ for each tooth $d_1$-$d_p$, $d_+$. The tooth signal $S_n$ is, for example, a start of tooth edge or rising edge, or, respectively, an end of tooth edge or falling edge, as illustrated. The measurement is taken as a function of time. Moreover, it is possible to extract from the measurement output by the sensor 1, the date $t_n$ when the tooth signal $S_n$ is produced and therefore the date $t_n$ when the tooth $d_1$-$d_p$, $d_+$ passes in front of the sensitive element 3.

The method for determining the angular position uses such a sensor 1 and comprises the following recurring and iterative steps. The processing unit 4 in charge of carrying out the method receives the measurement output by the sensor 1 and extracts therefrom, for each tooth passage, a tooth signal $S_n$ and the date $t_n$ of its occurrence.

The method introduces a third order recurrence. This means that the first processing requires there to be four tooth signals $S_n$ and therefore five associated dates $t_n$ in order to determine four time intervals $T_n$. Moreover, during the initialization, the first dates $t_n$ are saved, until there are five successive occurrences.

From the current date $t_n$ and the preceding date $t_{n-1}$, a current time interval $T_n$ is determined.

Each time a new tooth signal $S_n$ is received, an iteration is carried out, and the index changes. A preceding third order quantity, indexed n−3, is no longer useful, a preceding second order quantity, indexed n−2, becomes the new preceding third order quantity, a preceding first order quantity, indexed n−1, becomes the new preceding second order quantity, a current quantity, indexed n, becomes the new preceding first order quantity. A new current quantity, indexed n, is determined as a function of the new tooth signal $S_n$ received.

Thus, a first step consists in shifting the preceding time intervals $T_i$, for a value of i between n−2 and 2, according to the ordered and cascaded allocations: $T_{n-3} \leftarrow T_{n-2}$, $T_{n-2} \leftarrow T_{n-1}$, $T_{n-1} \leftarrow T_n$, where the arrow ← represents an allocation.

During a second step, a new current time interval $T_n$ is determined. A time interval $T_n$ is the duration between the current tooth signal $S_n$, or the last one received, and the preceding tooth signal $S_{n-1}$. The time interval $T_n$ is determined by calculating the difference between the respective dates, $t_n$ of the current tooth signal $S_n$ and $t_{n-1}$ of the preceding tooth signal $S_{n-1}$, according to the formula $T_n = t_{n-1}$.

The principle of the invention is to propose a test that makes it possible to distinguish a particular angular position, i.e. a position associated with a particular identifiable tooth. To this end, each time a new time interval $T_n$ is determined, a ratio $R_n$ that is a function of the current time interval $T_n$ and the preceding time intervals is calculated.

Once said particular tooth has been identified, the angular position of the toothed well 2, and therefore the shaft to which it is secured, is known precisely each time a tooth signal $S_n$ is received, for the future and retrospectively for the past. This makes it possible to precisely measure the angular position of a shaft, such as a camshaft.

The angular position of a camshaft is useful for sequencing an engine control 4 and for example for determining the date of an injection.

It is also conventionally used to specify the angular position of a crankshaft. Specifically, a crankshaft sensor measures a modulo 360° angle, while an engine cycle takes place over 720°. The angular position of a camshaft, which carries out on revolution per engine cycle, thus makes it possible to obtain a measurement of the modulo 720° crankshaft angle.

The angular position of a camshaft can also make it possible to determine a measurement of the backup crankshaft angular position if the crankshaft sensor fails. To this end, it is necessary, as advantageously proposed by the invention, for the method for determining the angular position of the camshaft to be autonomous and typically for it not to require the measurement from the crankshaft sensor.

According to one feature, a ratio $R_n$ is calculated according to the formula:

$$R_n = (T_n * T_{n-3}) / (T_{n-1} * T_{n-2}), \text{ where:}$$

$R_n$ is the ratio for the current tooth signal $S_n$, $T_n$ is the current time interval corresponding to the current tooth signal $S_n$, $T_{n-1}$ is the preceding first order time interval for the preceding first order tooth signal $S_{n-1}$, $T_{n-2}$ is the preceding second order time interval for the preceding second order tooth signal $S_{n-2}$ and $T_{n-3}$ is the preceding third order time interval for the preceding third order tooth signal $S_{n-3}$.

The ratio $R_n$ makes it possible to effectively distinguish a particular tooth, namely the second tooth $d_2$ immediately following the first tooth $d_1$, itself following the additional tooth $d_+$.

Figure 3:
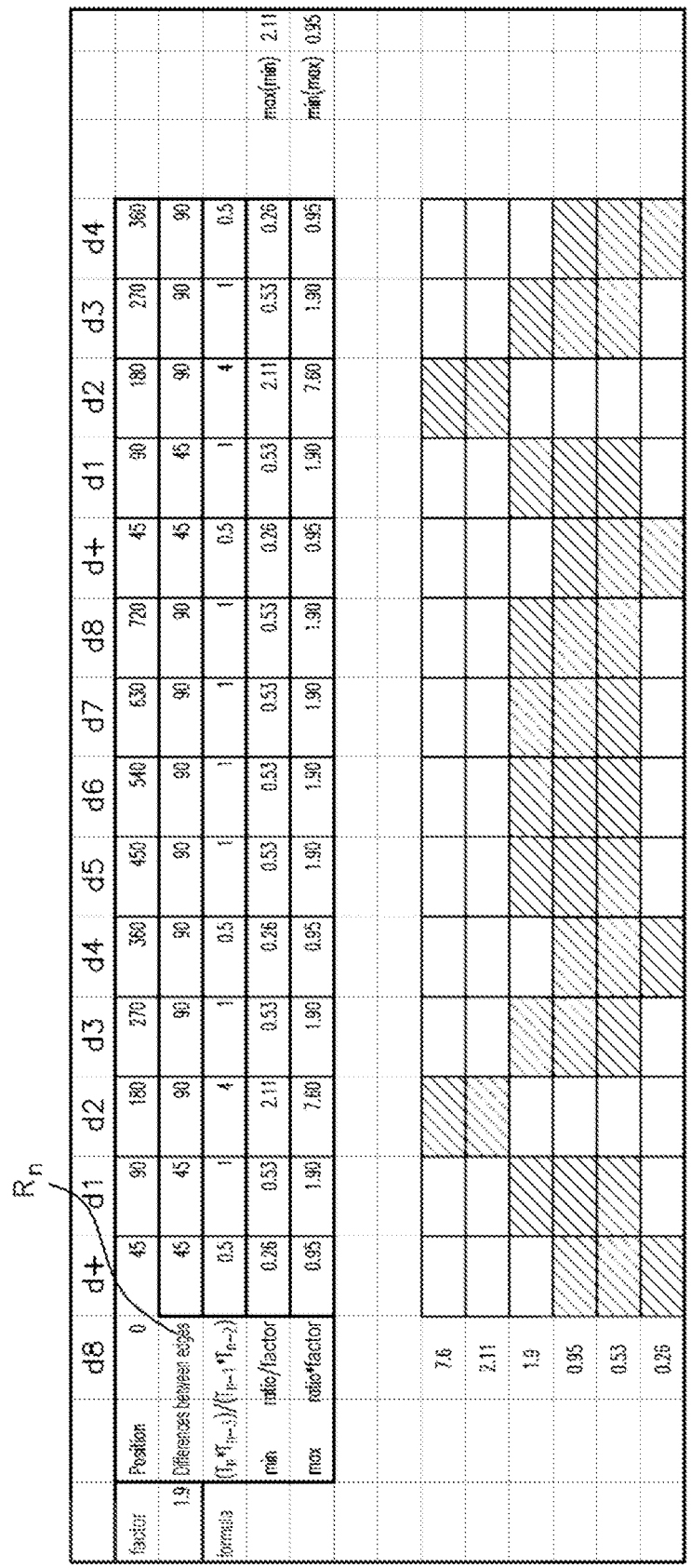
FIG. 3 illustrates a table of values of ratio $R_n$.

With reference to the table in FIG. 3, the values in the rows relating to the position and the angular deviations between edges are reported in crankshaft degrees, that is to say by measuring the position and angular deviations of the crankshaft. The corresponding values for measuring the position and angular deviations of the camshaft and therefore of the wheel 2 should be divided by two.

Thus, with reference to the table in FIG. 3, for an 8+1 toothed wheel, the ratio $R_n$, calculated assuming a constant rotational speed, adopts a value of 4 for the tooth $d_2$, while it adopts a value less than or equal to 1 for all the other teeth: 0.5 for $d_+$ and $d_4$ and 1 for the other teeth $d_1$, $d_3$, $d_5$, $d_6$, $d_7$ and $d_8$.

This significant difference, in a factor of 4, makes it easy to separate the particular tooth $d_2$ from the other teeth, by means of a threshold G chosen to be between 1 and 4.

This significant difference also makes it possible to reliably distinguish, including when incorporating an acyclism factor, taking into account the possible variations in speed of the shaft, for example during starting phases. Thus, by considering an acyclism factor of 1.9 or of 1/1.9=0.53, the rotational speed is considered to be able to vary in this relation and impact the time/angle conversion and thus the ratio $R_n$. By applying this acyclism factor to the preceding values, an interval [0.26; 0.95] is obtained for the teeth d+ and $d_4$, an interval [0.53; 1.9] is obtained for the teeth $d_1$, $d_3$, $d_5$, $d_6$, $d_7$ and $d_8$ and an interval [2.11; 7.6] is obtained for the tooth $d_2$, clearly separate from the two preceding intervals. This last interval, which is unique and clearly distinguished, makes it possible to determine the angular position with certainty.

Moreover, by choosing, empirically, a threshold G of between 1.9 (=1*1.9) and 2.11 (=4/1.9), to which the ratio Fin is compared, it is possible to determine whether the current tooth, of tooth signal Sp, is the particular tooth $d_2$ immediately following the tooth $d_1$, itself immediately following the additional tooth $d_{+-}$. If the ratio $R_n$ is greater than the threshold G, the current tooth is the particular tooth $d_2$. If, by contrast, the ratio $R_n$ is less than the threshold G, the current tooth is one of the other teeth $d_1$, $d_3$-$d_p$, $d_+$. Once the particular tooth $d_2$ has been identified, the following tooth signals $S_n$ can be associated with the following teeth with a high degree of certainty.

The fact that a particular tooth $d_2$ is recognized on each revolution of the toothed wheel 2 makes it possible to know the angular position of the toothed wheel 2 and of the associated shaft. The fact that this determination is absolute is advantageous in that it allows readjustment on each revolution, including in the case of loss (for example by interference) or addition (for example on account of a parasite) of a tooth signal $S_n$, or in the event of the direction of rotation of the toothed wheel 2 changing.

According to another feature, the threshold G is determined according to the formula: $G = k \cdot \max_{i=1 \ldots p, +}[((Ang_i - Ang_{i-1})*(Ang_{i-4} - Ang_{i-3}))/((Ang_{i-2} - Ang_{i-1})*(Ang_{i-3} - Ang_{i-2}))]$. In this formula, k is an acyclism factor, $Ang_i$ is the angular position of the i-th tooth, with i passing through all of the p+1 teeth $d_1$-$d_p$, $d_+$, including the additional tooth $d_+$, and max is the maximum function.

For an illustrative 8+1 toothed wheel 2, the threshold G calculated by the preceding formula is well within the preceding interval [1.9; 2.11].

According to another feature, the acyclism factor k is equal to 0.53, i.e. 1/1.9.

According to another feature, the method is advantageously applied to a camshaft.

The invention also relates to an engine control involving such a method.

The invention also relates to a motor vehicle comprising such an engine control.

The invention has been illustrated and described in detail in the drawings and the preceding description. The latter should be considered to be illustrative and given by way of example and not to limit the invention just to this description. Numerous embodiment variants are possible.

LIST OF REFERENCE SIGNS

1: Sensor,
2: Toothed wheel,
3: Sensitive element,
4: Engine control,
$d_1$-$d_8$, $d_p$, $d_+$: Tooth.

The invention claimed is:

1. A method for determining an angular position of a shaft by a sensor including a toothed wheel, secured to the shaft, including a plurality of p teeth distributed at equal angles and an additional tooth of the plurality of p teeth disposed between a last tooth of the plurality of p teeth and a first tooth of the plurality of p teeth, and a sensitive element that is disposed fixedly facing the toothed wheel and is able configured to detect a tooth of the plurality of p teeth, the method comprising:

receiving at least one tooth signal and a respective date thereof;

shifting preceding time intervals: $T_{n-3} \leftarrow T_{n-2}$, $T_{n-2} \leftarrow T_{n-1}$, $T_{n-1} \leftarrow T_n$;

determining a current time interval separating a current tooth signal of the at least one tooth signal from a preceding tooth signal of the at least one tooth signal, via a difference in the respective dates, according to a formula $T_n = t_n - t_{n-1}$, where $T_n$ is the current time interval, $t_n$ is the date of the current tooth signal and $t_{n-1}$ is the date of the preceding tooth signal;

calculating a ratio according to a formula $R_n = (T_n * T_{n-3})/(T_{n-1} * T_{n-2})$, where $R_n$ is the ratio for the current tooth signal, $T_n$ is the current time interval for the current tooth signal, $T_{n-1}$ is the time interval for a preceding first order tooth signal, $T_{n-2}$ is the time interval for a preceding second order tooth signal, and $T_{n-3}$ is the time interval for a preceding third order tooth signal;

comparing the calculated ratio with a threshold; and determining that the current tooth signal corresponds to a second tooth of the plurality of teeth immediately following the first tooth, the first tooth immediately following the additional tooth, when the calculated ratio is greater than the threshold.

2. The method as claimed in claim 1, wherein the threshold is determined according to the formula:

$$G = k \cdot \max_{i=1 \ldots p, +}[((Ang_i - Ang_{i-1})*(Ang_{i-4} - Ang_{i-3}))/((Ang_{i-2} - Ang_{i-1})*(Ang_{i-3} - Ang_{i-2}))],$$

where G is the threshold, max is a maximum function, k is an acyclism factor, $Ang_i$ is the angular position of an i-th tooth, with i passing through all of p+1 teeth, including the additional tooth.

3. The method as claimed in claim 2, wherein the acyclism factor k is equal to 0.53.

4. The method as claimed in claim 3, wherein the method is applied to a camshaft.

5. The method as claimed in claim 2, wherein the method is applied to a camshaft.

6. The method as claimed in claim 1, wherein the method is applied to a camshaft.

7. The method of claim 1, wherein the additional tooth is disposed halfway between the last tooth and the first tooth.

8. An engine control comprising:

a processor configured to implement a method of determining an angular position of a shaft by a sensor including a toothed wheel, secured to the shaft, including a plurality of p teeth distributed at equal angles and an additional tooth of the plurality of p teeth disposed between a last tooth of the plurality of p teeth and a first tooth of the plurality of p teeth, and a sensitive element that is disposed fixedly facing the toothed wheel and is configured to detect a tooth of the plurality of p teeth, the method comprising:

receiving at least one tooth signal and a respective date thereof, shifting preceding time intervals: $T_{n-3} \leftarrow T_{n-2}$, $T_{n-2} \leftarrow T_{n-1}$, $T_{n-1} \leftarrow T_n$, determining a current time interval separating a current tooth signal of the at least one tooth signal from a preceding tooth signal of the at least one tooth signal, via a difference in the respective dates, according to a formula $T_n = t_n - t_{n-1}$, where $T_n$ is the current time interval, $t_n$ is the date of the current tooth signal and $t_{n-1}$ is the date of the preceding tooth signal, calculating a ratio according to a formula $R_n=(T_n*T_{n-3})/(T_{n-1}*T_{n-2})$, where $R_n$ is the ratio for the current tooth signal, $T_n$ is the current time interval for the current tooth signal, $T_{n-1}$ is the time interval for a preceding first order tooth signal, $T_{n-2}$ is the time interval for a preceding second order tooth signal, and $T_{n-3}$ is the time interval for a preceding third order tooth signal, comparing the calculated ratio with a threshold, and determining that the current tooth signal corresponds to a second tooth of the plurality of teeth immediately following the first tooth, the first tooth immediately following the additional tooth, when the calculated ratio is greater than the threshold.

9. A motor vehicle comprising:

an engine control comprising a processor configured to implement a method of determining an angular position of a shaft by a sensor including a toothed wheel, secured to the shaft, including a plurality of p teeth distributed at equal angles and an additional tooth of the plurality of p teeth disposed between a last tooth of the plurality of p teeth and a first tooth of the plurality of p teeth, and a sensitive element that is disposed fixedly facing the toothed wheel and is configured to detect a tooth of the plurality of p teeth, the method comprising:

receiving at least one tooth signal and a respective date thereof, shifting preceding time intervals: $T_{n-3} \leftarrow T_{n-2}$, $T_{n-2} \leftarrow T_{n-1}$, $T_{n-1} \leftarrow T_n$, determining a current time interval separating a current tooth signal of the at least one tooth signal from a preceding tooth signal of the at least one tooth signal, via a difference in the respective dates, according to a formula $T_n=t_n-t_{n-1}$, where $T_n$ is the current time interval, $t_n$ is the date of the current tooth signal and $t_{n-1}$ is the date of the preceding tooth signal, calculating a ratio according to a formula $R_n=(T_n*T_{n-3})/(T_{n-1}*T_{n-2})$, where $T_n$ is the ratio for the current tooth signal, $T_n$ is the current time interval for the current tooth signal, $T_{n-1}$ is the time interval for a preceding first order tooth signal, $T_{n-2}$ is the time interval for a preceding second order tooth signal, and $T_{n-3}$ is the time interval for a preceding third order tooth signal, comparing the calculated ratio with a threshold, and determining that the current tooth signal corresponds to a second tooth of the plurality of teeth immediately following the first tooth, the first tooth immediately following the additional tooth, when the calculated ratio is greater than the threshold.

* * * * *